J. H. L. DE BATS.
METHOD OF TREATING METALS AND OTHER MATERIALS BY HEAT.
APPLICATION FILED MAR. 19, 1914. RENEWED JULY 11, 1916.
1,216,086.
Patented Feb. 13, 1917.
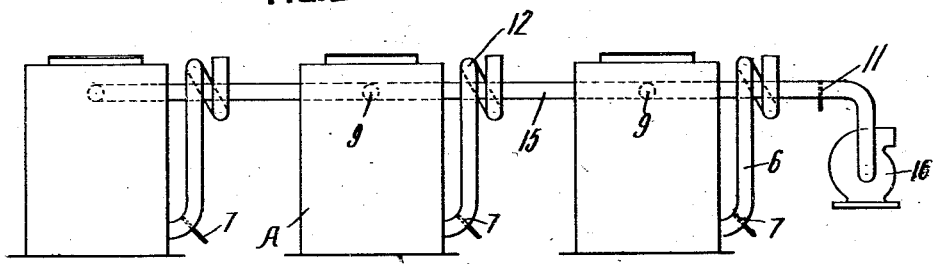
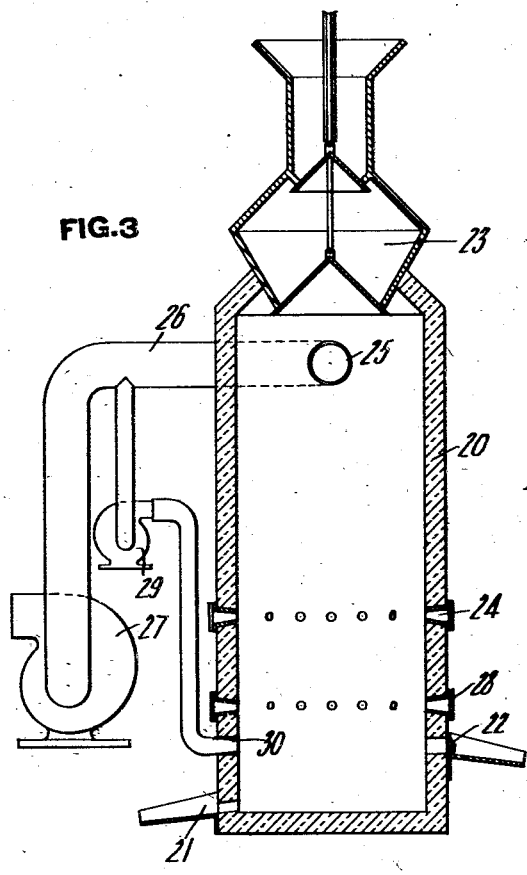
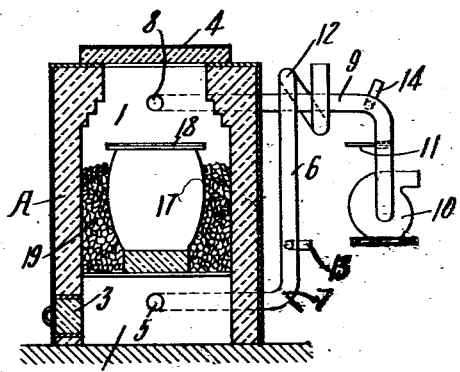

UNITED STATES PATENT OFFICE.

JEAN H. L. DE BATS, OF ZELIENOPLE, PENNSYLVANIA, ASSIGNOR OF ONE-THIRD TO ALFRED G. ZEHNER, OF ZELIENOPLE, PENNSYLVANIA, AND ONE-THIRD TO TENSARD DE WOLF, OF PITTSBURGH, PENNSYLVANIA.

METHOD OF TREATING METALS AND OTHER MATERIALS BY HEAT.

1,216,086.     Specification of Letters Patent.     Patented Feb. 13, 1917.

Continuation of application Serial No. 735,059, filed December 5, 1912. This application filed March 19, 1914, Serial No. 825,834. Renewed July 11, 1916. Serial No. 108,723.

*To all whom it may concern:*

Be it known that I, JEAN H. L. DE BATS, a subject of the Queen of Holland, and a resident of Zelienople, in the county of Beaver and State of Pennsylvania, have invented a new and useful Improvement in Methods of Treating Metals and other Materials by Heat, of which the following is a specification.

This invention relates to an improvement in the method of melting, smelting, heating or treating metals, ores or other materials with solid fuel. The method is particularly applicable to treating metals or ores, either for heating, smelting or melting the same, but is also applicable in any case where it is desired to subject any material to treatment by heat. The object of the invention is to reduce the cost of the treatment by using less fuel, to increase the output, to reduce oxidation of the material treated, crucibles or containers in which the material is held or the chamber linings; and generally to improve prior methods of heat treating materials by insuring greater uniformity of and control over combustion of the fuel and the temperatures produced, and to safeguard the health of the workman.

The method may be carried out in any suitable apparatus in which the fuel may be placed in a closed chamber, and consists, broadly speaking, in mechanically and by suction reducing the air pressure in said chamber and maintaining it at a partial vacuum, air being admitted to the fuel either through one or more regulable air inlets or by one or more inlets so limited or restricted in size that the air pressure within the chamber is maintained lower than the external pressure.

The material to be treated may be handled in any suitable manner. For example, it may be placed in a crucible surrounded by the fuel, as in ordinary crucible furnace practice; or it may be embedded between layers of fuel, as in a cupola or blast furnace; or it may be placed in a container in the furnace chamber or in a container which is so located as to permit the absorption of heat by the material either directly by radiation or by the flow of the gases.

By this method the air admitted to the fuel can be limited, if desired, to practically that volume required for complete combustion, and at the same time it may be carried over or through the fuel at any practical velocity required. Perfect combustion requires only sufficient air to cover the surface of the fuel. Any additional air, by absorbing and carrying off heat, wastes the fuel. Combustion is accelerated by the rapid renewal or change of the air contacting with the exposed surface of the fuel, that is, the total surface of all the fragments thereof. By the method of this invention the air may be restricted in volume at any instant to that amount required for complete combustion and may be renewed as rapidly as desired to accelerate combustion. In addition, because the chamber is under a partial vacuum, that is, under equal negative pressure throughout, the air admitted is thoroughly diffused and distributed throughout the entire fuel bed, and for the same reason has a uniform velocity through the entire body of air. There is no loss of pressure or velocity at the instant of impact with the fuel, but the air current can be perfectly controlled throughout the entire chamber without increasing the volume of air above that required for combustion. This is in direct contradistinction to the effect produced by a blower forcing air into or through the fuel, in which case the action is localized at the wrong point, a large part of the work being done at the instant of impact with the fuel, velocity and pressure being there expended and control being lost throughout the remainder of the fuel bed and chamber unless a largely increased and excessive air volume is used, which naturally produces material waste. The method is also distinct from natural draft, where volume cannot be limited without restricting and decreasing the velocity, in addition to which natural draft has many physical limitations and also certain essential elements that necessarily waste heat.

By conserving the heat energy and utilizing it in the zone of the material being treated, the time of treatment and fuel are both reduced; by limiting the air supply oxidation of the material being treated, of the crucibles, containers and chamber linings is also reduced; and by accurately controlling the combustion of the fuel the temperature of the heat treatment required for any particular material may be secured within narrow limits and may be maintained uniformly. Moreover, since all leaks are inwardly no poisonous gases or fumes can escape into the room, and when the top or cover of the chamber, or the charging door is opened the air rushes in therethrough to the conduit leading to the fan, thereby practically shutting down the furnace and making the working conditions safe and agreeable.

The invention comprises the several method steps hereinafter described and claimed.

In the drawings, Figure 1 represents a sectional elevation of one form of apparatus suitable for carrying out the invention; Fig. 2 is a diagrammatic view showing a multiple arrangement; and Fig. 3 is a sectional elevation, showing another form of apparatus for carrying out the invention.

The invention can be carried out in any apparatus so constructed that the fuel can be held in an inclosed chamber which is maintained under a pressure lower than the external pressure, the details of construction of the apparatus being more or less immaterial. Fig. 1 illustrates one form of suitable apparatus for carrying out the invention, and shows an ordinary pit or crucible furnace A which has been selected largely for purposes of illustration. Said furnace has an inner chamber 1 and the usual ash pit 2 which may be sealed tightly by a suitable door 3. The top of the furnace is closed by a suitable cover or door 4, which fits as tightly as possible. The air inlet to the furnace consists of one or more openings 5, only one being shown, to which air is supplied by a conduit 6. The air inlets may be introduced in different zones of the fuel bed or chamber if, as in a deep coke fire, it may be desirable to supply air for the solid fuel or combustible gases at different points. The conduit 6 may be provided with a suitable damper or valve 7, or it or the opening or openings 5 may be made of a certain definite restricted size, so that by properly regulating the suction fan, as hereinafter described, the pressure within the chamber 1 may be maintained at all times below the external pressure. Near the top of the furnace is a discharge opening 8, leading to a conduit 9 through which the products of combustion are withdrawn from the furnace chamber by a suitable exhaust fan 10. Conduit 9 may be provided with a suitable damper or valve 11 to shut off the furnace entirely when desired. The conduit 9 may be cooled in any suitable manner to reduce the temperature of the gases passing off from the furnace before reaching the fan, such as an ordinary water cooling jacket, but preferably by a portion 12 of the conduit 6 which surrounds the conduit 9, which not only cools the waste gases, but also preheats the air used for combustion and consequently conserves heat. Under some circumstances it may be desirable to place an anemometer 13 in the air inlet to measure the air velocity, for by knowing the air velocity and the dimensions of the inlet, the volume of air may be readily calculated. It may be desirable also to place a thermostat 14 in the conduit 9 to automatically regulate the fan so as to take care of any variation in the volume of gases handled thereby on account of any variation in temperature of the gases at different times.

Batteries of two or more furnaces of the type described may also be used, as shown in Fig. 2, where three furnaces, indicated at A, have their discharge pipes 9 connected to a common conduit 15 leading to the suction fan or pump 16. Each of the furnaces in the battery may be provided with a separate air inlet or all may be supplied with air through a common conduit, or by restricted inlets, as desired.

In carrying out the method with the apparatus described, the material to be treated is placed in a crucible or container 17, preferably provided with a cover 18, and which crucible is placed in the chamber 1 and surrounded by a bed 19 of solid fuel. The fuel is ignited and the door 3 in the ash pit may be opened to permit a large volume of air to carry heat from the lower stratum of fuel up through the entire furnace chamber. As soon as the fuel is red hot and steady combustion begins, the door 3 is closed, and either by regulating the speed of the fan in connection with the limited or restricted air inlet 5, or by regulating the damper 7 to control the effective size of the inlet, just sufficient air is admitted to cover the exposed surface of the fuel, that is, the total exposed surface of all the fragments of fuel. This air is renewed rapidly, thus giving rapid and uniform combustion and conserving the heat in the zone containing the crucible and the material being treated. The suction fan maintains the internal pressure in the chamber 1 at a point below the external pressure except when the top or cover 4 is removed for charging or adding fuel, which automatically shuts down the furnace. If the method is carried out and the furnace operated under theoretically perfect conditions the amount of air supplied to the furnace is substantially just sufficient to produce perfect combustion, but in practice may be something more than this amount. However, the air supply is always either restricted or regulated so that the pressure within the furnace is less than the outside pressure, but the beneficial results of the invention are secured up to the very point where the pressures inside and outside of the furnace chamber are equal. The best results are secured by limiting the volume of air to that amount required for complete combustion at any instant and then renewing the air as rapidly as it is desired, by regulating the speed of the fan or pump, to accelerate combustion, velocity being controlled by raising or lowering the pressure inside the chamber, and until this negative air pressure inside the chamber is raised to the point where it is equal to the outside pressure there will still be a certain control of the air under this system.

The invention can also be applied with considerable advantage in a cupola or blast furnace, without material modification in the structure thereof. For example, Fig. 3 shows a cupola furnace in which the invention may be carried out. This furnace comprises the usual body 20 provided with a tap-hole 21 and a slag notch 22. The top of the furnace is closed by a charging bell 23 of well known construction, through which the material is charged. Air is admitted to the bottom of the cupola or at various levels through one or a plurality of twyers 24, which may communicate at their outer ends directly with the atmosphere or with a common wind-box, as is usual. At or near the upper end of the furnace is an outlet 25 for the waste gases, which are withdrawn from the cupola through a conduit 26 by a suitable suction fan or pump 27. The construction described is typical of both the cupola and blast furnace, which differ mainly in size and purpose.

In operating the cupola described the material and solid fuel are charged at the top through the bell 23 in the usual manner, the bell preventing the leakage of air into the cupola during the charging operation. The material and fuel, and also flux if used, may be thoroughly intermingled or may be laid in layers, as desired. The air inlet, that is, the twyer or twyers 24, are provided either with regulating valves or dampers 28, or are so restricted or limited in size that the internal pressure in the cupola chamber can be maintained lower than the external pressure. The suction fan or pump exhausts the waste gases from the top of the furnace and reduces the pressure uniformly throughout the entire cupola, so that the air admitted is thoroughly diffused and distributed through the entire bed of fuel and metal or ore and also has a uniform velocity through the entire cupola.

Since all leaks are inward it is usually necessary to provide a suitable small blower 29 communicating with an inlet 30 at the slag level and on the opposite side of the cupola from the slag hole, for blowing the slag out at intervals or when necessary. Preferably, the intake of the blower 29 communicates with conduit 26, so that the gas blown into the furnace for forcing out the slag will not oxidize the material being melted or smelted.

By carrying out the method in the manner shown the volume of air admitted to the furnace may be limited to approximately the amount necessary for combustion and at the same time combustion is accelerated by rapid renewal of the air. Oxidation of metals and materials is reduced and the cost of operation is also reduced by decreasing the amount of fuel required.

This application is a continuation of my prior application for method of heating or melting metals or ores, filed December 5th, 1912, Serial No. 735,059.

What I claim is:

1. The method of treating metal or metal bearing substances by heat, consisting in placing the substance and solid fuel in a closed chamber, withdrawing the products of combustion from said chamber mechanically by suction, admitting air to the fuel in said chamber, and regulating the volume and velocity of the air supply independently in a manner to maintain a lower pressure within said chamber than externally and to control the rate of combustion and the resulting temperature.

2. The method of treating metal or metal bearing substances by heat, consisting in placing the substance and solid fuel in a closed chamber, withdrawing the products of combustion from said chamber mechanically by suction, admitting air to the fuel in said chamber, restricting the air supply in a manner to control its volume, and regulating the suction in a manner to control the velocity of the air supply, and thereby regulating the rate of combustion and the temperature in said chamber.

3. The method of treating metal or metal bearing substances by heat, consisting in placing the substance and solid fuel in a closed chamber having the space therein maintained under partial vacuum created mechanically by suction, admitting air into said chamber, restricting the air supply in a manner to maintain the pressure within said chamber lower than the external air pressure, and withdrawing the products of combustion from said chamber by suction.

4. The method of treating metal, consisting in placing the same in a crucible surrounded by a mass of ignited solid fuel in a closed chamber having the space therein under partial vacuum created by suction and having a regulable bottom air inlet, admitting into the bottom of said chamber only substantially the proper amount of air for complete combustion of the fuel, and withdrawing the products of combustion from the chamber by suction, thereby burning the fuel substantially completely in the zone containing the metal and conserving the heat and confining it to said zone to thus melt the metal in said crucible.

5. The method of treating metal, consisting in embedding the same in a mass of ignited solid fuel in a closed chamber having the space therein under partial vacuum created by suction and having a regulable bottom air inlet, admitting into the bottom of said chamber under pressure above the pressure therein only substantially the proper amount of air to effect complete combustion of the fuel, allowing the air to thoroughly diffuse and distribute around the lower stratum of the fuel, and withdrawing the products of combustion from the chamber by suction, thereby burning the fuel in the zone containing the metal and conserving the heat and confining it to said zone.

6. The method of treating metal, consisting in placing the same in a container in contact with a mass of ignited solid fuel in a closed chamber having the space therein under partial vacuum created by suction and having a regulable bottom air inlet, admitting into the bottom of said chamber under pressure above that inside said chamber only substantially the proper amount of air to effect complete combustion of the fuel and allowing the air to thoroughly diffuse and distribute beneath the fuel, and rapidly withdrawing the products of combustion from the chamber by suction, thereby burning the fuel and the combustible gases that are formed while in the zone containing the metal and conserving the heat and confining it to said zone to thus heat the metal in said container.

In testimony whereof, I have hereunto set my hand.

JEAN H. L. DE BATS.

Witnesses:
ELBERT L. HYDE,
WILLIAM B. WHARTON.